(12) United States Patent
Caporal Del Barrio et al.

(10) Patent No.: US 11,909,477 B2
(45) Date of Patent: Feb. 20, 2024

(54) UPLINK BEAM RECONFIGURATION

(71) Applicant: NOKIA TECHNOLOGIES OY, Espoo (FI)

(72) Inventors: Samantha Caporal Del Barrio, Aalborg (DK); Frederick Vook, Schaumburg, IL (US); Johannes Harrebek, Aalborg (DK); Simon Svendsen, Aalborg (DK); Jun Tan, Glenview, IL (US); Benny Vejlgaard, Gistrup (DK); Kim Nielsen, Storvorde (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 313 days.

(21) Appl. No.: 17/328,826

(22) Filed: May 24, 2021

(65) Prior Publication Data
US 2021/0384954 A1 Dec. 9, 2021

(30) Foreign Application Priority Data
May 27, 2020 (FI) ..................... 20205545

(51) Int. Cl.
*H04B 7/06* (2006.01)
*H04W 16/28* (2009.01)
(Continued)

(52) U.S. Cl.
CPC .......... *H04B 7/0617* (2013.01); *H04B 7/086* (2013.01); *H04B 17/318* (2015.01); *H04W 16/28* (2013.01)

(58) Field of Classification Search
CPC ...... H04B 7/0617; H04B 7/086; H04B 7/088; H04B 17/318; H04B 17/327;
(Continued)

(56) References Cited

U.S. PATENT DOCUMENTS

| 7,027,837 B1* | 4/2006 | Uhlik ................... H01Q 19/104 455/562.1 |
| 9,596,687 B1 | 3/2017 | Manchanda et al. |

(Continued)

FOREIGN PATENT DOCUMENTS

| WO | WO 2017/196612 A1 | 11/2017 |
| WO | WO 2019/095299 A1 | 5/2019 |

(Continued)

OTHER PUBLICATIONS

Extended European Search Report for European Application No. 21176141.6 dated Oct. 29, 2021, 9 pages.
(Continued)

*Primary Examiner* — Michael Thier
*Assistant Examiner* — Prince A Mensah
(74) *Attorney, Agent, or Firm* — ALSTON & BIRD LLP (57) ABSTRACT

A method comprises: determining, from an indication that an initial uplink beam between a user equipment and a network node is misaligned with respect to a downlink beam between the network node and the user equipment, at least one misalignment angle between the initial uplink beam and the downlink beam; and reconfiguring the uplink beam based on the misalignment angle to produce a reconfigured uplink beam.

20 Claims, 7 Drawing Sheets
(7 of 7 Drawing Sheet(s) Filed in Color)

(51) Int. Cl.
*H04B 17/318* (2015.01)
*H04B 7/08* (2006.01)

(58) Field of Classification Search
CPC ... H04W 16/28; H04W 36/30; H04W 72/046; H04W 74/0808
See application file for complete search history.

(56) References Cited

U.S. PATENT DOCUMENTS

| | | | |
|---|---|---|---|
| 10,594,383 B1* | 3/2020 | Orhan | H04B 7/0617 |
| 10,700,760 B1* | 6/2020 | Berliner | H04B 17/327 |
| 11,619,702 B2* | 4/2023 | Gummadi | G01S 5/02 |
| | | | 342/378 |
| 2013/0027250 A1* | 1/2013 | Chen | G01S 3/56 |
| | | | 342/368 |
| 2013/0040682 A1 | 2/2013 | Chang et al. | |
| 2018/0132252 A1 | 5/2018 | Islam et al. | |
| 2018/0206170 A1* | 7/2018 | Nagaraja | H04W 16/28 |
| 2018/0227862 A1 | 8/2018 | Liu et al. | |
| 2019/0132033 A1 | 5/2019 | Akkarakaran et al. | |
| 2019/0268794 A1 | 8/2019 | Tsai et al. | |
| 2019/0319686 A1 | 10/2019 | Chen, IV et al. | |
| 2020/0052756 A1 | 2/2020 | Raghavan et al. | |
| 2020/0337048 A1* | 10/2020 | Abedini | H04L 5/0044 |
| 2020/0413268 A1* | 12/2020 | Yerramalli | H04W 72/046 |
| 2021/0127379 A1 | 4/2021 | Harrebek et al. | |
| 2021/0258061 A1 | 8/2021 | Harrebek et al. | |
| 2021/0399774 A1* | 12/2021 | Rafique | H04B 7/0617 |
| 2022/0352962 A1* | 11/2022 | Huang | H04B 7/088 |

FOREIGN PATENT DOCUMENTS

| | | |
|---|---|---|
| WO | WO 2019/108395 A1 | 6/2019 |
| WO | WO 2019/161733 A1 | 8/2019 |
| WO | WO 2021/053650 A1 | 3/2021 |

OTHER PUBLICATIONS

"3rd Generation Partnership Project; Technical Specification Group Radio Access Network; NR; Physical layer procedures for data (Release 15)", 3GPP TS 38.214 v15.9.0, (Mar. 2020), 107 pages.
"3rd Generation Partnership Project; Technical Specification Group Radio Access Network; Study on New Radio Access Technology Physical Layer Aspects (Release 14)", 3GPP TR 38.802 v14.2.0, (Sep. 2017), 145 pages.
"RAN4 #91 Meeting Report", 3GPP TSG-RAN WG4 Meeting #92, R4-1907901, (Aug. 26-30, 2019), 892 pages.
"Third Generation Partnership Project (3GPP) Draft Meeting Report for TSG RAN meeting: 84", 3GPP TSG RAN meeting #85, RP-191612, (Sep. 16-19, 2019), 193 pages.
Office Action and Search Report for Finland Application No. 20205545 dated Jan. 18, 2021, 8 pages.

* cited by examiner

UPLINK BEAM RECONFIGURATION

CROSS-REFERENCE TO RELATED APPLICATIONS

This application claims priority to Finnish Application No. 20205545, filed May 27, 2020, the entire contents of which are incorporated herein by reference.

TECHNOLOGICAL FIELD

Various example embodiments relate to a method, an apparatus and a computer program for uplink beam reconfiguration.

BACKGROUND

In a wireless telecommunications network, such as a 5G network, uplink and downlink beams are formed between user equipment and a network node to support communication between the user equipment and the network node. Although techniques exist for configuring those uplink and downlink beams, poor communication performance between the user equipment and the network node can occur. Accordingly, it is desired to provide an improved technique for supporting communication between the user equipment and the network node.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided a method, comprising: determining, from an indication that an initial uplink beam between a user equipment and a network node is misaligned with respect to a downlink beam between said network node and said user equipment, at least one misalignment angle between the initial uplink beam and the downlink beam; and reconfiguring the uplink beam based on the misalignment angle to produce a reconfigured uplink beam.

The method may comprise receiving at the user equipment the indication from the network node and/or determining the indication within the user equipment.

The indication may be an indication of a power difference between an expected reception power level at the network node and an actual reception power level at the network node.

The indication may comprise at least one of a message from the network node indicating the power level difference; a message from the network node requesting uplink realignment; and a message from the network node requesting a change in uplink power level.

The method may comprise determining the misalignment angle from prestored information which relates values of the indication to values of the misalignment angle.

The prestored information may relate values of the indication to values of the misalignment angle for a plurality of initial uplink beams.

The prestored information may indicate a plurality of different misalignment angles for the indication and the method may comprise selecting a smallest of the plurality of different misalignment angles as the misalignment angle.

The method may comprise reconfiguring the uplink beam based on the misalignment angle to produce the reconfigured uplink beam which avoids a transmission null along the misalignment angle.

The method may comprise reconfiguring the uplink beam based on the misalignment angle to produce the reconfigured uplink beam with an increased gain along the misalignment angle compared to the initial uplink beam.

The method may comprise reconfiguring the uplink beam based on the misalignment angle to produce the reconfigured uplink beam with an increased gain along all directions of the misalignment angle compared to the initial uplink beam.

The method may comprise reconfiguring the uplink beam based on the misalignment angle to produce the reconfigured uplink beam at least partially as a cone formed by rotating the misalignment angle in space produce the reconfigured uplink beam with increased gain along the misalignment angle compared to the initial uplink beam.

The initial uplink beam may have a major transmission direction and the method may comprise reconfiguring the uplink beam based on the misalignment angle to produce the reconfigured uplink beam with a decreased gain along the major transmission direction.

The initial uplink beam may have a current major transmission direction and the method may comprise reconfiguring the uplink beam based on the misalignment angle to produce the reconfigured uplink beam with a null along the current major transmission direction.

The method may comprise reconfiguring the uplink beam by retaining all those antenna array elements used to produce the initial uplink beam and applying changed antenna array configuration values of all those antenna array elements based on the misalignment angle to produce the reconfigured uplink beam.

The method may comprise reconfiguring the uplink beam by applying changed antenna array configuration values based on the misalignment angle to produce the reconfigured uplink beam.

The method may comprise reconfiguring the uplink beam by applying changed antenna array phase shifter values based on the misalignment angle to produce the reconfigured uplink beam.

The method may comprise reconfiguring the uplink beam by applying changed antenna array values based on the misalignment angle to produce a plurality of sub-array uplink beams to create the reconfigured uplink beam.

The method may comprise determining the changed antenna array values from prestored information which relates values of the misalignment angle to values of gain for the changed antenna array values.

The prestored information may relate values of the misalignment angle to a values of gain for a plurality of changed antenna array values.

The method may comprise selecting that one of the plurality of changed antenna array values which achieves a greatest gain improvement for the misalignment angle.

The prestored information may relate different ranges of values of the misalignment angle to a corresponding plurality of changed antenna array values for that range and the method may comprise determining which range of values of the misalignment angle that the misalignment angle falls within and selecting that one of the plurality of changed antenna array values corresponding to that range.

The at least one misalignment angle comprise a set of misalignment angles.

According to various, but not necessarily all, embodiments of the invention there is provided a computer program comprising instructions for causing an apparatus to perform at least the following: determining, from the indication that an initial uplink beam between a user equipment and a network node is misaligned with respect to a downlink beam between said network node and said user equipment, at least one misalignment angle between the initial uplink beam and the downlink beam; and reconfiguring the uplink beam based on the misalignment angle to produce a reconfigured uplink beam.

The computer program may comprise instructions for causing an apparatus to perform the method set out above.

According to various, but not necessarily all, embodiments of the invention there is provided an apparatus, comprising: means for determining, from an indication that an initial uplink beam between a user equipment and a network node is misaligned with respect to a downlink beam between said network node and said user equipment, at least one misalignment angle between the initial uplink beam and the downlink beam; and means for reconfiguring the uplink beam based on the misalignment angle to produce a reconfigured uplink beam.

The apparatus may comprise means for receiving at the user equipment the indication from the network node.

The apparatus may comprise means for determining the indication within the user equipment.

The indication may be an indication of a power difference between an expected reception power level at the network node and an actual reception power level at the network node.

The indication may comprise at least one of a message from the network node indicating the gain difference; a message from the network node requesting uplink realignment; and a message from the network node requesting a change in uplink power level.

The means for determining may determine the misalignment angle from prestored information which relates values of the indication to values of the misalignment angle.

The prestored information may relate values of the indication to values of the misalignment angle for a plurality of initial uplink beams.

The prestored information may indicate a plurality of different misalignment angles for the indication, the means for determining may select a smallest of the plurality of different misalignment angles as the misalignment angle.

The means for reconfiguring may reconfigure the uplink beam based on the misalignment angle to produce the reconfigured uplink beam which avoids a transmission null along the misalignment angle.

The means for reconfiguring may reconfigure the uplink beam based on the misalignment angle to produce the reconfigured uplink beam with an increased gain along the misalignment angle compared to the initial uplink beam.

The means for reconfiguring may reconfigure the uplink beam based on the misalignment angle to produce the reconfigured uplink beam with an increased gain along all directions of the misalignment angle compared to the initial uplink beam.

The means for reconfiguring may reconfigure the uplink beam based on the misalignment angle to produce the reconfigured uplink beam at least partially as a cone formed by rotating the misalignment angle in space produce the reconfigured uplink beam with increased gain along the misalignment angle compared to the initial uplink beam.

The initial uplink beam may have a major transmission direction and the means for reconfiguring may reconfigure the uplink beam based on the misalignment angle to produce the reconfigured uplink beam with a decreased gain along the major transmission direction.

The initial uplink beam may have a current major transmission direction and the means for reconfiguring may reconfigure the uplink beam based on the misalignment angle to produce the reconfigured uplink beam with a null along the current major transmission direction.

The means for reconfiguring may reconfigure the uplink beam by retaining all those antenna array elements used to produce the initial uplink beam and applying changed antenna array configuration values of all those antenna array elements based on the misalignment angle to produce the reconfigured uplink beam.

The means for reconfiguring may reconfigure the uplink beam by applying changed antenna array configuration values based on the misalignment angle to produce the reconfigured uplink beam.

The means for reconfiguring may reconfigure the uplink beam by applying changed antenna array phase shifter values based on the misalignment angle to produce the reconfigured uplink beam.

The means for reconfiguring may reconfigure the uplink beam by applying changed antenna array values based on the misalignment angle to produce a plurality of sub-array uplink beams to create the reconfigured uplink beam.

The means for reconfiguring may determines the changed antenna array values from prestored information which relates values of the misalignment angle to values of gain for the changed antenna array values.

The prestored information may relate values of the misalignment angle to a values of gain for a plurality of changed antenna array values.

The means for reconfiguring may select that one of the plurality of changed antenna array values which achieves a greatest gain improvement for the misalignment angle.

The prestored information may relate different ranges of values of the misalignment angle to a corresponding plurality of changed antenna array values for that range and the means for reconfiguring may determine which range of values of the misalignment angle that the misalignment angle falls within and select that one of the plurality of changed antenna array values corresponding to that range.

The at least one misalignment angle comprise a set of misalignment angles.

According to various, but not necessarily all, embodiments of the invention there is provided an apparatus, comprising: logic operable to determine from an indication that an initial uplink beam between a user equipment and a network node is misaligned with respect to a downlink beam between said network node and said user equipment, at least one misalignment angle between said initial uplink beam and said downlink beam and to reconfigure said uplink beam based on said misalignment angle to produce a reconfigured uplink beam.

The apparatus comprise logic operable to correspond with the means of the apparatus and its embodiments set out above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some example embodiments will now be described with reference to the accompanying drawings in which.

DETAILED DESCRIPTION

Before discussing the example embodiments in any more detail, first an overview will be provided. Some embodiments provide a technique where, typically following a trigger to determine whether a misalignment has occurred, misalignment of an uplink beam with respect to a downlink beam between a user equipment and network node is detected based on information available to the user equipment, a misalignment angle is determined from that information and the misalignment angle is then used by the user equipment to reconfigure the uplink beam to improve or mitigate the misalignment between the uplink beam and the downlink beam so improve the power of transmissions received at the network node from the user equipment. The trigger can be provided externally, for example by messaging from the network node or provided internally, for example based on a timer or on information within the user equipment. The misalignment angle can typically be considered to be a set of one or more misalignment angles and often two or more misalignment angles, orientated in different directions. For example, the misalignment angle may be determined, but the direction can differ based on the configuration of the antenna array—for a linear array the misalignment can be in two possible directions, one or the other side of the current beam configuration, but for a 2-dimensional array such as a rectangular or square array more directions are possible. That misalignment has occurred can be determined from an indication of misalignment in a variety of ways, such as from explicit messaging received at the user equipment from the network node or from other network nodes (such as other user equipment receiving transmissions from the user equipment) regarding the misalignment, from existing messages from the network node regarding the strength and/or quality of the uplink and/or derived from information received or generated by the user equipment itself based on, for example, information regarding transmissions made from other antenna arrays of that user equipment or by measuring impedance mismatches in that user equipment. The user equipment typically stores information which relates or maps the indication received or generated by the user equipment to sets of possible misalignment angles, that information is typically either pre-stored by the user equipment or compiled by the user equipment dynamically through use. The set of possible misalignment angles can then be determined from the indication received using the stored information. The set of possible misalignment angles can then be used to reconfigure the uplink beam. Once again, the user equipment typically stores information which relates or maps the performance of different configurations of the user equipment's antenna array at different azimuth (misalignment) angles, that information is typically either pre-stored by the user equipment or compiled by the user equipment dynamically through use. The user equipment selects a different configuration of the user equipment's antenna array which improves the directivity of the uplink beam towards the network node at that set of possible misalignment angles. That reconfiguring of the uplink beam seeks at the least to avoid any transmission nulls along the set of possible misalignment angles towards the network node. The reconfiguration seeks to increase the gain of the uplink beam towards the network node. This can be achieved in some circumstances by switching off some antenna elements to broaden the uplink beam. This can be achieved in some circumstances by reconfiguring the antenna array into subarrays. This can be achieved in some circumstances by reducing power transmission or creating a null along the current transmission angle of the uplink beam (that is along the major transmission direction which is generally at 0° azimuth) and redeploying that power to increase the power transmission along the set of possible misalignment angles and towards the network node. Thus, in some circumstances, rather than switching to a beamforming arrangement which uses fewer antennas to broaden the uplink beam, instead all the currently used antenna elements can continue to be used but the shape of the beam changed to redeploy the power more towards the misalignment angle. This significantly increases the amount of power available, which is particularly useful in power-limited circumstances such as when the user equipment is on the cell edge.

Uplink Beam Misalignment

Figure 1:
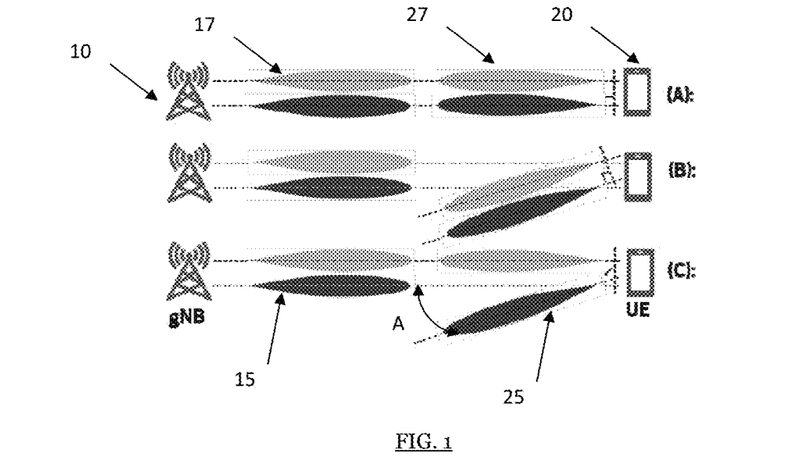
FIG. 1 illustrates uplink/downlink beam correspondence and misalignment.

FIG. 1 illustrates uplink/downlink beam correspondence and misalignment. A gNB 10 has an uplink beam 15 and a downlink beam 17. A user equipment 20 has an uplink beam and a downlink beam 27.

As can be seen in FIG. 1A, the uplink beam 25 and the downlink beam 27 are in correspondence (meaning that they are aligned and parallel) and they are directed towards the corresponding uplink beam 15 and downlink beam 17.

As can be seen in FIG. 1B, the beam correspondence of the user equipment is preserved because the uplink beam 25 and downlink beam 27 are still aligned and parallel but now they are not directed towards the corresponding uplink beam 15 and downlink beam 17, which results in a suboptimal downlink and uplink with a similar reduced gain on both uplink and downlink.

FIG. 1C illustrates a misalignment between the uplink beam 25 and the downlink beam 27 because the uplink beam 25 and downlink beam 27 are no longer aligned and parallel but now the uplink beam 25 and downlink beam 27 diverge by an angle A. This misalignment can occur for a variety of reasons and can occur dynamically in the field due to, for example, impedance variation of power amplifiers, low noise amplifiers and/or switches which are affected by temperature, design tolerances, power levels of operation (which can cause small shifts), as well as power imbalances. In particular, a mismatch towards the antenna or towards further amplifiers can affect the uplink and downlink directivity, whereby the beams will exhibit a different directivity towards the gNB 10. It will be appreciated that this is not limited to such occurrences and could include any type of unwanted variance of radio-frequency (RF) performance with any component(s) associated with the antenna control circuitry, receiver chain(s) and transmitter chain(s). Furthermore, if the direction of the uplink beam 25 does not correspond with the downlink beam 27 then power is not ultimately received at the gNB 10. The problem of beam misalignment is less severe for the gNB 10 than it is for the user equipment 20. This is because the freedom allocated for antenna design on the gNB is significantly higher than on the user equipment 10, where the mmWave antenna arrays will have to share volume with other electrical components and antenna for sub-6 GHz communication. Moreover, the user equipment 10 have a large number of constraints such as, for example, supporting a very large bandwidth for worldwide coverage, and they are often implemented with more cost-effective embedded components, thus compromising tolerance levels and resulting in impedance variations across different operational settings. Thus, the impedance of the receive and transmit chains may change and change differently across different power and gain settings which means that even balancing out the impact of any impedance mismatch helps little as the user equipment 20 adapts the closed loop power regulation of the gNB 10.

Hence, uplink/downlink beam correspondence is preserved if: Identical antenna element weights used for uplink and downlink results in identical beam gain and direction for uplink and downlink; Antenna element weights can be offset by pre-characterized values to obtain identical beam gain and direction for uplink and downlink; Two "codebooks" of beam weight vectors have been established, one for uplink and a second for downlink. Each beam weight vector in the uplink codebook is paired 1-1 with a beam weight vector in the downlink codebook such that the paired uplink and downlink beam weight vectors have identical beam and gain directions. If these are not fulfilled, then beam correspondence is broken and the uplink will be misaligned as depicted in FIG. 1C.

Figure 2:
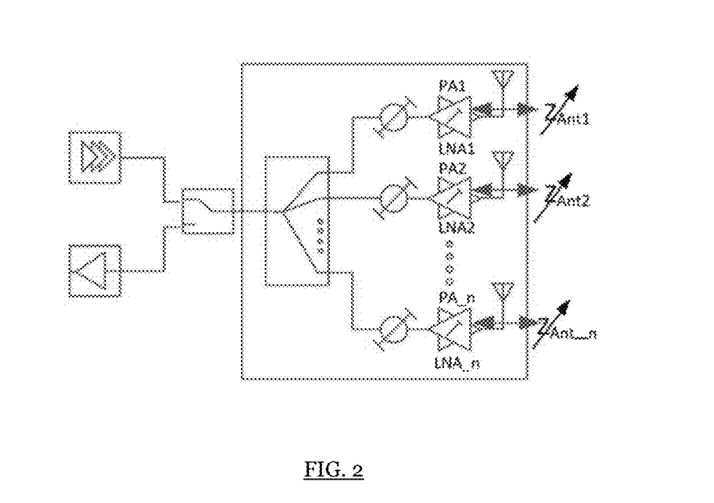
FIG. 2 illustrates impedance mismatches within the user equipment.

The impedance mismatches within the user equipment 20 can be seen in more detail in FIG. 2 which is a transmit and receive simplified block diagram of the user equipment showing the different impedances towards the low noise amplifier and the power amplifier. The impedances at the individual elements in the antenna array Zant will change as a function of the required frequency and the configured angular direction of the main beam. As such, each element will exhibit different impedances at any given time, which will affect the performance of the individual power amplifiers PA and low noise amplifiers LNA connected to that specific element. A power amplifier is generally much more sensitive to changes in load impedances than a low noise amplifier, so the effects of the power amplifier load impedance changes are not captured in the beam alignment procedures, since they rely on downlink only, but as part of the calibration or configuration of the transmission beam control and configuration that secures the reception and transmission beam directions are aligned upon calibration/configuration. In addition, the power amplifier misbehaviours are not only caused by the changes in load impedances but also power amplifier related factors like output power level, ambient temperature and potential gain modes. So, the actual radiation pattern formed by the antenna array will be affected by these different power amplifier and low noise amplifier misbehaviours and result in different radiation patterns for downlink and uplink, even with identical array configuration (weights). These differences in the radiation patterns can be insignificant for some array/RF front end configurations (boresight at low power) but be severe for other configurations (angular steered direction at high power) and result in beam non-correspondence, when configuration or calibration is insufficient for the state of the circuit.

Although there is an existing beam alignment procedure, this comprises aligning the downlink beam 17 with the downlink beam 27 and beam correspondence is then assumed to occur at both the gNB 10 and the user equipment 20 since an optimal uplink beam alignment is considered to have been derived from aligning the downlink beams. However, as mentioned above and as illustrated in FIG. 1C, even aligning the downlink beams 17 with the downlink beam 27 does not resolve the misalignment or mismatch in the uplink beam 25 with the uplink beam 15 since the downlink beam 27 and the uplink beam 25 are misaligned by the misalignment angle A. Although it may be possible to compensate for the misalignment, this would potentially take a very long time to perform and the overhead of trying all possibilities of realigning the uplink beam 25 may result in a radio link failure. Accordingly, some embodiments provide a simplified technique to realign the uplink beam 25 with the downlink beam 27.

Uplink Beam Misalignment Detection

Figure 3:
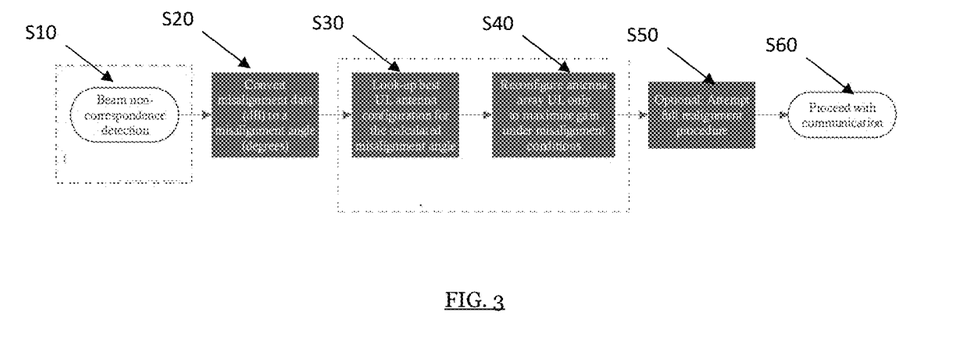
FIG. 3 illustrates the main processing blocks performed by the user equipment.

FIG. 3 illustrates the main processing blocks performed by the user equipment 20 which, in response to an internal or external trigger, upon detection of misalignment of the uplink beam 25 and the downlink beam 27, autonomously triggers asymmetric uplink downlink beamforming to maximize the power of the uplink beam 25 received by the gNB 10 and reduce the risk of radio link failure. Should no action be taken upon detection of misalignment, this can result in a significant gain loss and radio link failure.

Accordingly, following a trigger, at block S10, uplink beam 25/downlink beam 27 misalignment or non-correspondence detection occurs. The detection can occur in a variety of different ways such as, for example, the user equipment 20 may receive a message from the gNB 10 explicitly identifying that the uplink beam 25 is misaligned by a number of dB; the user equipment 20 may receive a message from the gNB 10 requesting uplink alignment by receiving a configuration for sounding reference signal (SRS) beam sweeping and the user equipment 20 interprets this as an indication that the uplink beam 25 is misaligned with the gNB 10, and in connection with that the user equipment 20 applies uplink beam 25 reconfiguration as a means to mitigate uplink loss and avoid radio link failure; the user equipment 20 interprets autonomously from one or more gNB 10 indications (for example, power level requests) that the uplink beam 25 is misaligned and as a result commences the uplink beam 25 reconfiguration; the user equipment 20 receives indications from other user equipment that they are receiving the uplink beam 25; and/or the user equipment 20 itself determines that the uplink beam 25 is misaligned from analysing, for example, information regarding transmissions made from other antenna arrays of that user equipment 20 or by measuring impedance mismatches in that user equipment 20.

Misalignment Angle Determination

Figure 4A:
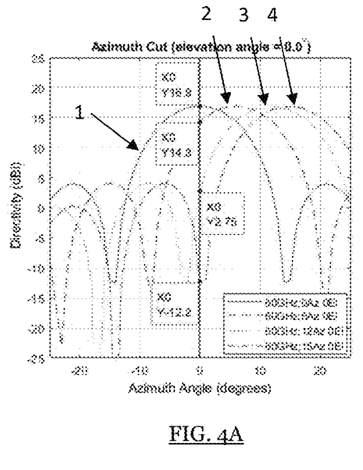
FIGS. 4A-4D illustrate information which relates to an azimuth offset angle against power for different configurations of the user equipment antenna array.
Figure 4B:
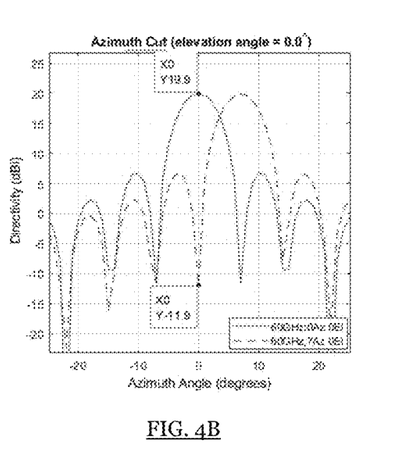

At block S20, the user equipment 20 converts the misalignment indicator (for example, a power difference or loss of gain) to a set of possible misalignment angles A, typically in degrees. Typically, the set of possible misalignment angles A can be derived from pre-stored information which relates azimuth offset (misalignment) angles against power for different configurations of the user equipment antenna such as that as shown in FIGS. 4A and 4B. FIG. 4A shows the expected gain with respect to one possible azimuth (misalignment) angle for a first configuration of the antenna array (in this example for an 8×8 antenna array) while FIG. 4B shows the expected gain with respect to one possible azimuth (misalignment) angle for a second configuration of the antenna array (in this example for an 4×4 antenna array). Such pre-stored information is typically provided for each different configuration of the antenna array.

Assuming that the antenna array is currently configured as an 8×8 antenna array, then Line 1 in FIG. 4A shows the expected user equipment 20 antenna gain with respect to azimuth (misalignment) angle, and so if the beams are aligned (as shown in FIG. 1A) then a maximum user equipment 20 antenna gain of 16.9 dB is directed towards the gNB 10. However, should it be determined at block S10 that there is an uplink power drop by 2.6 dB while no power drop is recorded in downlink, then that could be an indication that the UE antenna gain has dropped to 14.3 dB, which according to line 2 of FIG. 4A indicates a misalignment angle A of 6°. Similarly, if the uplink power drops by 14.2 dB while the no power drop is recorded in downlink, then that could be an indication that the UE antenna gain has dropped to 2.75 dB, which according to line 3 indicates a misalignment angle A of 12°. Lastly, if the uplink power drops by 29 dB while the no power drop is recorded in downlink, then that could be an indication that the user equipment 20 antenna gain has dropped to −12.2 dB, which according to line 4 indicates a misalignment angle A of 15°. Hence, it can be seen that for any indicated user equipment 20 antenna gain drop, an appropriate misalignment angle A can be derived from the mapping shown in FIG. 4A. Where multiple solutions for the same antenna gain drop are possible then it can be assumed, at least at first instance, that the misalignment angle A is the smallest value of the possible misalignment angles A. For example, if a user equipment 20 antenna gain drop of 16.9 dB is experienced then it can be assumed that the misalignment angle A is 13° rather than 16°. If the antenna array is currently configured as a 16×16 antenna array then the misalignment angle A is determined from FIG. 4B. For example, if there is a drop in user equipment 20 antenna gain of 32 dB from 19.9 dB to −11.9 dB, then the misalignment angle A is determined to be 7°.

As can be seen from FIGS. 4A and 4B, the sensitivity of the antenna array to uplink beam non-correspondence depends on the array size. The larger the array, the narrower the beam and the more sensitive it is to misalignment with the gNB 10 uplink beam 15. As such, the problem of misalignment increases with frequency as the beams become narrower (with the associated increased demand for high beam direction accuracy) for the sustained link budget and this eventually affects throughput.

Figure 4C:
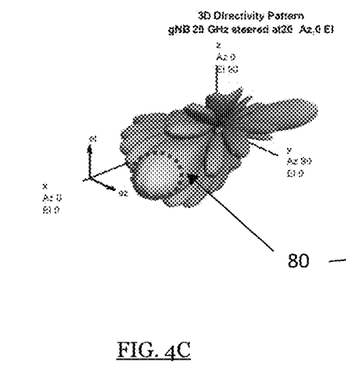
Figure 4D:
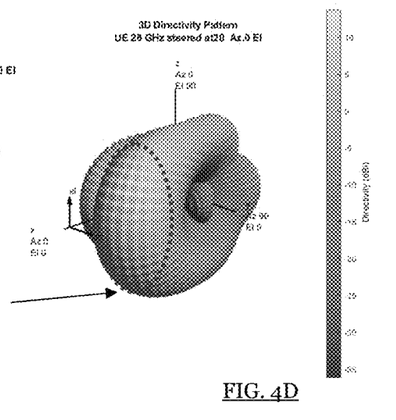

Also, even when a misalignment angle is known, it is not known in which direction the misalignment is occurring, as illustrated in FIGS. 4C and 4D which illustrates that the misalignment can be in any direction along the curves 80 which illustrate the set of possible misalignment angles. These curves can be circular, FIG. 4C. where one value of possible misaligned angles if enough, but they could also be elliptical whereby multiple values of the misaligned angles is needed, to re-configure the optimal antenna array radiation pattern.

Once the set of possible misalignment angles A has been determined at block S20 then processing proceeds to block S30.

Uplink Beam Misalignment Correction

At block S30, an improved uplink antenna configuration is determined for the calculated set of possible misalignment angles A. Again, this is typically determined by reference to pre-stored information within the user equipment 20 regarding the performance of different configurations of the antenna array at different misalignment angles A. The main aim is to avoid an antenna radiation pattern configuration which presents a null in the direction which is aligned with the uplink beam 15 (which is offset by the misalignment angle A from the current 0° azimuth) and which improves the gain and power transmission in the direction which is aligned with the uplink beam 15 (which is offset by the misalignment angle from the current 0° azimuth) compared to the current configuration. The pre-stored information can be of different granularities, ranging from a detailed understanding of the performance of each configuration through to a lookup table which provides a single configuration for each of a range of misalignment angles A, as will be described in more detail below. A number of different types of reconfiguration are possible, as will now be described.

Uplink Beam Misalignment Correction—Beam Broadening

Figure 5:
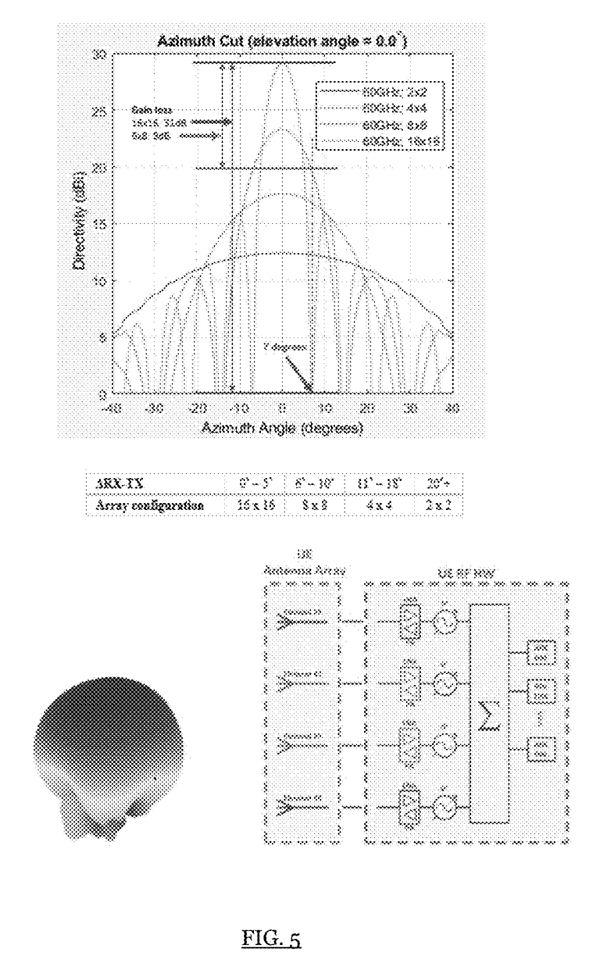
FIG. 5 illustrates the gain performance of different user equipment antenna array configurations at different azimuth angles.

FIG. 5 shows the gain performance of different configurations at different azimuth (misalignment) angles. As can be seen, if the antenna array is currently configured as a 16×16 antenna array and is experiencing a misalignment where one angle of the set of possible angles A being 7° in azimuth as reported at block S20, then it can be determined that the antenna array is presenting a null in the uplink beam 25 in the direction towards the uplink beam 15 of the gNB 10. However, by reconfiguring to an 8×8 antenna array then the gain loss towards the uplink beam 15 of the gNB 10 is only 9 dB compared to 31 dB, which presents a fast recovery improvement of 22 dB. As can be seen, the reconfiguring to an 8×8 antenna array provides the best performance improvement for that misalignment angle A. The reduction in the number of used antenna elements to broaden the antenna array uplink beam 25 can be achieved simply, for example, by turning off some of the power amplifiers as shown in FIG. 5. This reconfiguration also reduces power consumption. As can also be seen in FIG. 5, rather than providing a detailed mapping of each possible configuration, a lookup table can instead be used which indicates the required configuration for each of a different range of possible misalignment angles A.

Uplink Beam Misalignment Correction—Phase Shift Reconfiguration

Figure 6A:
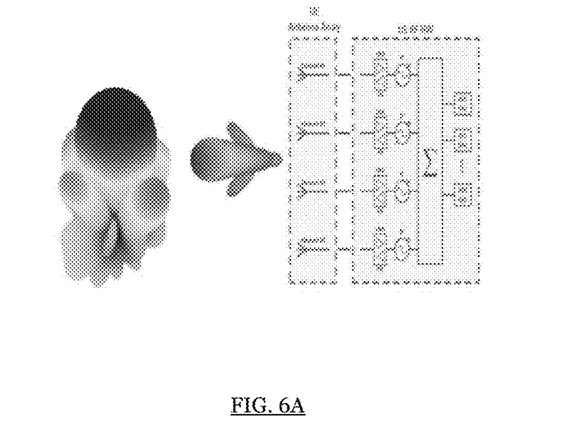
FIGS. 6A and 6B illustrate the gain performance of different user equipment antenna array configurations at different azimuth angles.
Figure 6B:
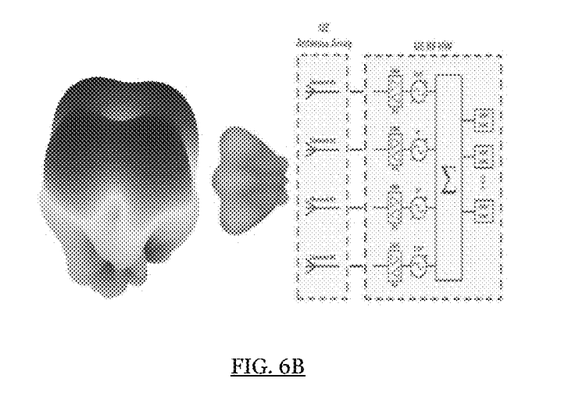

In some user equipment, if the phase shifter resolution allows it, the antenna array can be reconfigured to maximize the gain in the direction which is aligned with the uplink beam 15 (which is offset by the set of possible misalignment angles from the current 0° azimuth). This is illustrated in FIG. 6, where the initial uplink beam 25 is shown in FIG. 6A and the reconfigured uplink beam 25 is shown in FIG. 6B.

As can be seen, the reconfigured uplink beam 25 maximizes the gain in all possible directions of the set of possible misalignment angles A by adapting the values of the phase shifters. In this approach, all antennas of the array elements continue to be used and are shifted to cover all possible tilt directions of the misalignment angle. The benefit of this approach is that a null is presented along the misalignment angle (the current 0° azimuth—which points away from the GNB 10) and the power is instead focused in a cone-shaped beam which maximizes power in all possible directions in the direction which is aligned with the uplink beam 15 (which is offset by the misalignment angle from the current 0° azimuth).

Figure 7:
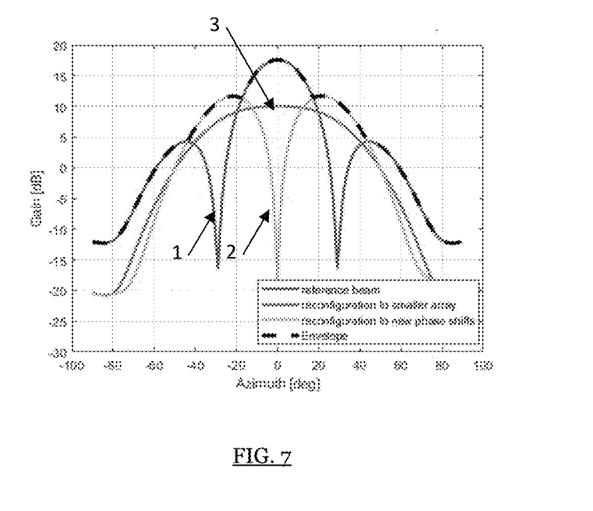
FIG. 7 illustrates different gains under different user equipment antenna array configurations at different azimuth angles.

As can be seen in FIG. 7, which compares the gain from the original beam in line 1, the reconfiguration by adjusting the phase shifters in line 2 and the switching off of some of the power amplifiers in line 3, the reconfiguration of the phase shifters consistently provides more gain and increased power delivered to the gNB 10 for all configurations, which improves the performance of the uplink, particularly under power-limited circumstances such as when the user equipment 20 is at a cell edge.

Uplink Beam Misalignment Correction—Multiple Non-Overlapping Simultaneously Active Subarrays Another approach for user equipment 20 with multiple transceivers (hybrid beam forming) is to reconfigure the antenna array to provide multiple non-overlapping simultaneously active subarrays, each having wider beams than when all elements are used. This results in a broader combined radiation pattern over which a transparent transmit diversity scheme can be used to preserve the total transmit power of the user equipment 20 (assuming the user equipment 20 has an architecture wherein a power amplifier is behind every antenna element) which results in a loss of transmit power when elements are shutoff. Examples of a transparent diversity scheme are delay diversity, random precoding, etc.

Figure 8A:
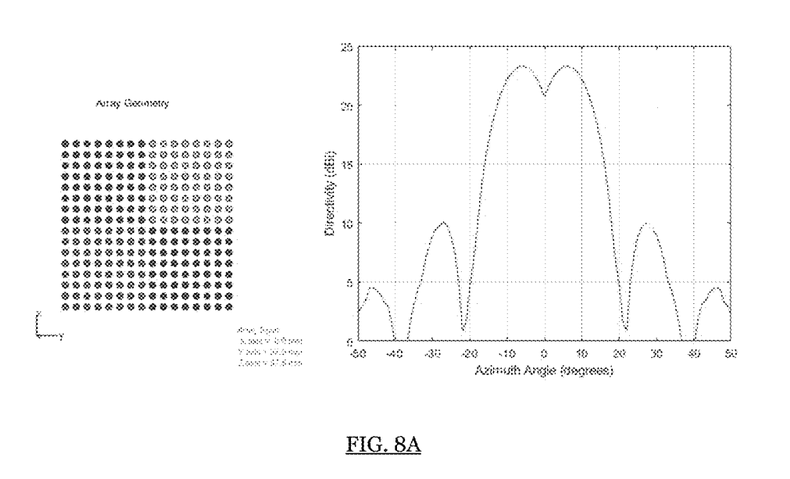
FIGS. 8A and 8B illustrate different gains under different multiple non-overlapping simultaneously active subarray configurations.
Figure 8B:
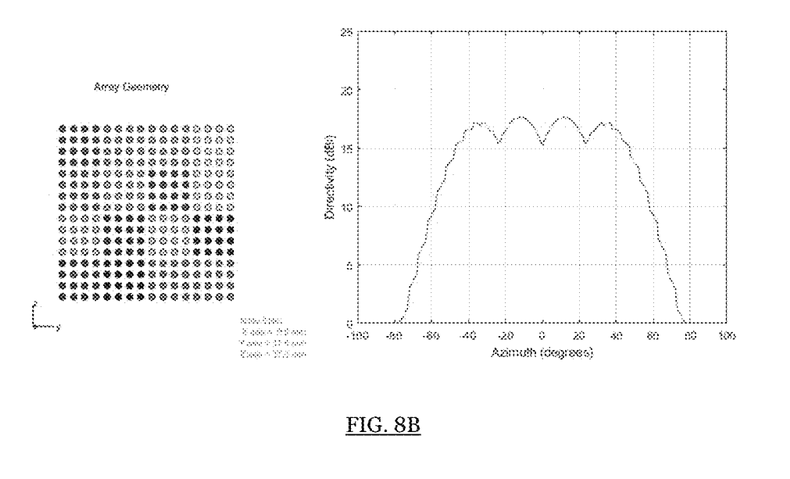

FIG. 8A shows the case where a 16×16 antenna array is split into four subarrays, the gain envelope of the resulting radiation pattern is shown for a configuration where all subarrays are active simultaneously. Similarly, FIG. 8B shows splitting the 16×16 antenna array into 16 subarrays. Again, these gain patterns can be pre-stored and the configuration having the highest gain can be selected for each misalignment angle either directly from the pre-stored information or from a lookup table which provides the optimal configuration at each different range of misalignment angles.

Figure 9:
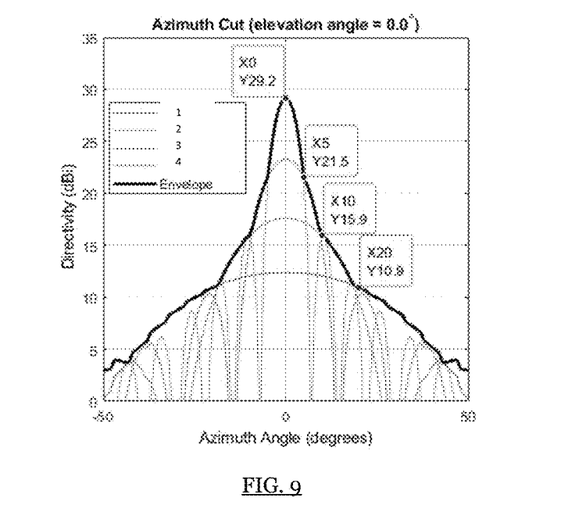
FIG. 9 illustrates different gains under different user equipment antenna array configurations at different azimuth angles.

FIG. 9 shows an example mapping of gain to azimuth (misalignment) angle for four different configurations of the antenna array. Table 1 shows the directivity across all array configurations and angles, together with the highest gain per misalignment angle.

TABLE 1

| Misalignment Angle (deg) | 0 | 5 | 6 | 7 | 8 | 10 | 11 | 14 | 18 | 20 | 22 | 28 |
|---|---|---|---|---|---|---|---|---|---|---|---|---|
| Config 1 (dBi) | 12 | 12 | 12 | 12 | 12 | 12 | 12 | 12 | 11 | 11 | 11 | 9 |
| Config 2 (dBi) | 17 | 17 | 17 | 17 | 17 | 16 | 16 | 14 | 11 | 10 | 8 | −6 |
| Config 3 (dBi) | 23 | 22 | 21 | 20 | 18 | 16 | 12 | −6 | 8 | 10 | 10 | 0 |
| Config 4 (dBi) | 29 | 22 | 14 | −2 | 9 | 14 | 16 | 0 | 11 | 8 | −30 | 5 |

From Table 1, the lookup Table 2 can be built relating the misalignment of the best array configuration and Table 2 can then be stored in memory of the user equipment 20 in order to save resources.

TABLE 2

| ΔRX-TX | 0°-4° | 5°-9° | 10°-17° | 18°+ |
|---|---|---|---|---|
| Array configuration | Config 4 | Config 3 | Config 2 | Config 1 |

The resulting effective antenna gain then follows the envelope of all possible reconfigurations. Although the possible reconfigurations can be limited to one of the techniques mentioned above, the reconfigurations could also be compiled from any possible reconfigurations that could be made by that user equipment, and so the table can include different reconfiguration techniques for reducing the number of antenna elements, for reconfiguring the phase shifters and/or for reconfiguring to multiple non-overlapping simultaneously active subarrays. In each case, the configuration which achieves the best gain within that set of possible misalignment angles range will be provided in the lookup table shown in Table 2. In other words, the lookup table needs to encompass all possible reconfigurations of the user equipment. The lookup table is implementation specific, it depends on the phase shifter resolution, the number of transceivers, the array size and the like. The lookup table is built up from the envelope of all configurations and combinations are possible. Also, if the tilt direction is known by the user equipment 20, the user equipment might be able to simply access the codebook to realign the uplink beam 25. The codebook does not contain an entry for the specific tilt (for example, the resolution is too coarse) then specific directions can also be part of the lookup table for array reconfiguration.

Once the required reconfiguration has been selected, then processing proceeds to block S40.

At block S40, the reconfiguration is applied to the antenna array.

Optionally, at block S50, a full realignment procedure is performed.

As block S60, communication between the user equipment 20 and gNB 10 resumes.

User Equipment

Figure 10:
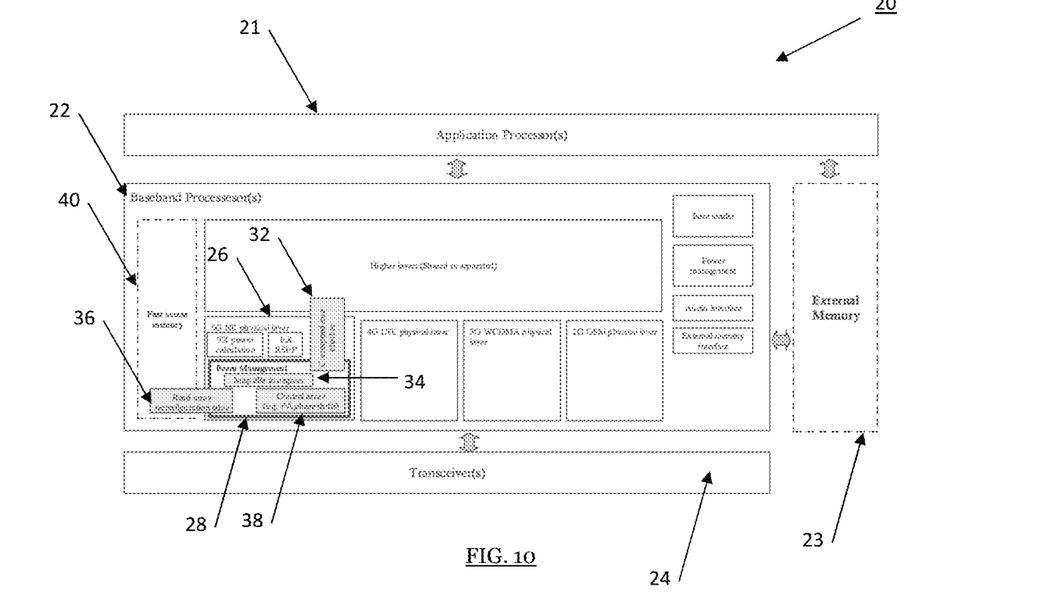
FIG. 10 illustrates components of the user equipment.

FIG. 10 schematically illustrates the arrangement of the user equipment 20. There is provided an application processor 21, a baseband processor 22, both of which communicate with external memory 23. The baseband processor communicates with one or more transceivers 24. The baseband processor 22 runs a 5G new radio (NR) physical layer 26 which has a beam management function 28. The beam management function 28 has a correspondence checker 32 which checks for indications of beam misalignment, a mapper 34 which maps the misalignment indicator (typically provided in dB or in another way) to a set of possible misalignment angles A in degrees with reference to the information mapping gain to misalignment for the current configuration mentioned above. A read array reconfiguration table 36 provides the optimal reconfiguration for the set of possible misalignment angles A determined and a control array 38 reconfigures the antenna array to the optimal reconfiguration for that set of possible misalignment angles. Hence, the read array reconfiguration table 36 relates uplink/downlink user equipment mismatch angle (for example, in degrees) to an optimum array reconfiguration to maximize the user equipment uplink gain. This lookup table can be stored in memory 40 of the user equipment 20. Moreover, it can be a fixed table or a dynamic table presenting learning and storing capabilities over time using, for example, machine learning (for example, updating the values or through adaptive granularity). The beam management function 28 gets as an input, the correspondence check output, it then estimates the set of possible misalignment directions and uses the read array reconfiguration table 36 stored in memory 40 to pick the best entry for optimum uplink power transfer. Finally, the control array 38 controls the array (for example, turns on/off the power amplifiers and/or adjusts the phase shifters and/or divides the antenna array into subarrays) according to the chosen table entry.

Example Operation

Figure 11:
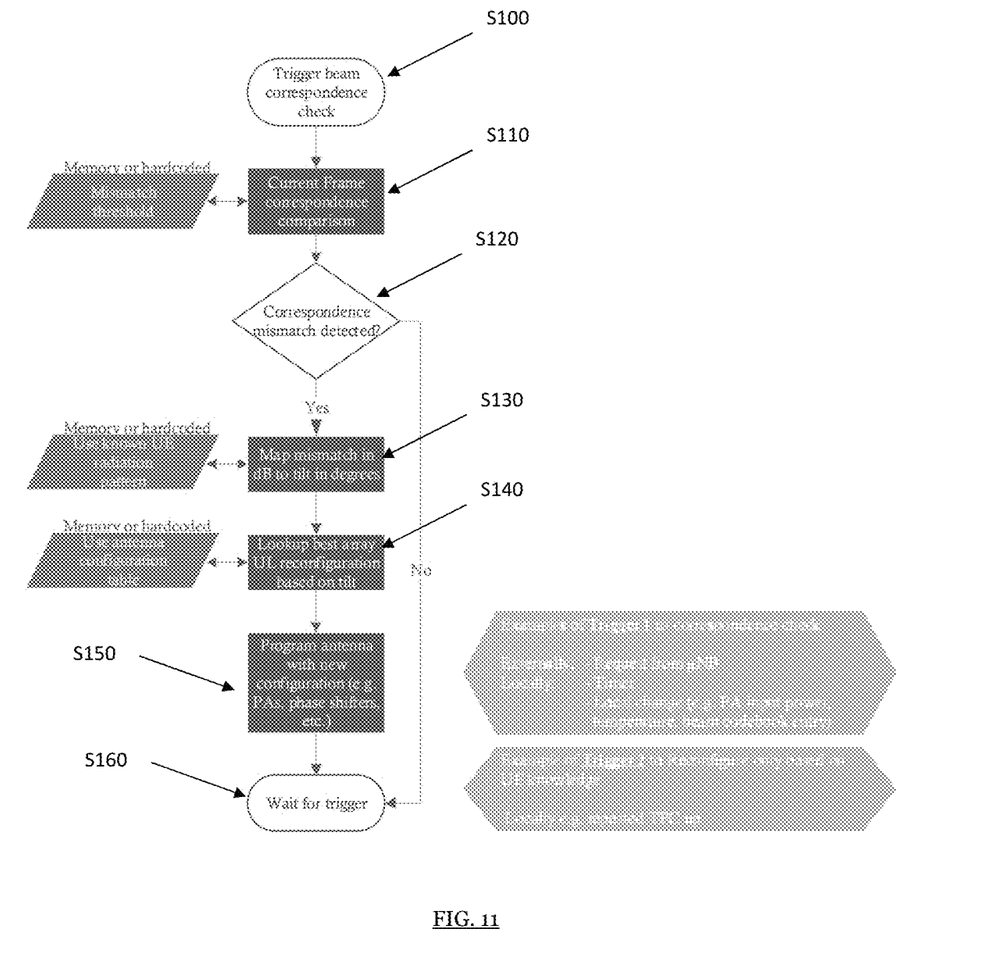
FIG. 11 illustrates the processing blocks performed by the user equipment.

FIG. 11 describes in more detail the operation of the user equipment 20. At block S100, the correspondence checker 32 is activated to perform a beam correspondence check.

At block S110, a mismatch threshold is determined.

At block S120, a determination is made of whether the misalignment or beam correspondence mismatch is greater than the threshold (this is either detected autonomously or is assisted through information provided by the gNB 10, typically indicated by a reduction in gain or expected power received by the gNB, although other indications are possible as mentioned above).

If the misalignment is less than the threshold then processing proceeds to block S160 where another trigger to perform the misalignment check is awaited. The triggers can be of different types; for example, two types of triggers, trigger 1 and trigger 2. Trigger 1 initiates the beam correspondence check and may be initiated or assisted by the gNB 10, whilst trigger 2 initiates the array reconfiguration autonomously. Trigger 1 may be a full procedure i.e. a correspondence mismatch calculation (involving the gNB 10 to evaluate the difference in dB between the downlink beam 27 and the uplink beam 25, named ARX-TX). Trigger 1 can be based on events local to the user equipment 20 or on events external to the user equipment 20. Local examples of trigger 1 can be power amplifier input power changes, temperature variation, beam realignment (i.e. a change in codebook entry) or internal trigger, as detailed in FIG. 11. External examples of trigger 1 can be a correspondence check requested by gNB 10.

Trigger 2 initiates an array reconfiguration directly. The user equipment 20 autonomously determines that the beam correspondence is broken, infers that it might be in a reduced antenna gain direction or even a null direction and decides to reconfigure the array to increase the gain.

Returning now to block S120, if the misalignment is greater than the threshold amount then processing proceeds to block S130.

At block S130, the mapper 34 refers to the radiation pattern for the current configuration to map the reduction in gain to a set of possible misalignment angles A. Processing then proceeds to block S140.

At block S140, the read array reconfiguration table 36 is read to determine the best reconfiguration to be made for the set of possible misalignment angles determined at block S130. Processing then proceeds to block S150.

At block S150, the control array 38 programs the antenna with the new configuration provided by the read array reconfiguration table 36. Processing then proceeds to block S160 to await the next trigger.

Hence, upon a trigger occurring, and once the severity of the misalignment is known by the user equipment 20, the user equipment 20 initiates a fast array reconfiguration in uplink only, to limit the gain reduction impact from the beam non-correspondence. This results in an asymmetrical uplink downlink beam to address the beam non-correspondence and avoid possible radio link failure. Once the uplink beam is optimized, the user equipment 20 might attempt a full realignment procedure such as that described in 3GPP TR 38.802 section 6.1.6 and TS 38.214 section 5.2. Else, if the full array alignment procedure is not possible (for example, the phase shifter resolution is too coarse or there is an unknown tilt) then the user equipment 20 may keep the reconfiguration as the best uplink option. Furthermore, it may periodically, based on changes in operating conditions or upon gNB 10 request, attempt to restore the original antenna configuration and reconfirm beam correspondence in order to enable fast recovery from temporary dynamic misalignment events. Hence, once the user equipment 20 has reached an array reconfiguration that has recovered power transmission, it will remain in this state until trigger 1 or trigger 2 provoke a change such as a new correspondence mismatch process or an autonomous reconfiguration or to trigger a beam check at every frame or based on a timer (fixed or adaptive). If the user equipment 20 is at maximum transmission power, the gNB 10 may compensate for the residual loss in uplink gain budget by increasing its receive antenna gain if possible.

The use of uplink only reconfiguration is a very powerful tool to combat transmission/reception misalignment, as a full beam realignment is not only costly in terms of resources and throughput but it is also very time consuming and might even cause a radio link failure (uplink disappearing with e.g. 30 dB link loss at 7 degrees of misalignment on a 16×16 array). There are major advantages in using this procedure to adapt the uplink pattern only, e.g. reduce power consumption, interference and avoid radio link failures. This allows the user equipment 20 to rapidly address misalignment as well as to avoid radio link failure.

Although it is possible to attempt a full realignment directly upon beam non-correspondence detection, this is a lengthy procedure that in itself might cause radio link failure. If this procedure is alternated with the current antenna state (i.e. misaligned), it further slows down the procedure and is also likely to cause a radio link failure. Another solution could be to blindly reconfigure the array to the smallest array configuration. Although, this will not necessarily provide the optimum available gain and might even not provide sufficient gain to compensate propagation loss. Similarly, reconfiguring to the next smaller array configuration (e.g. from 16×16 to 8×8) will not guarantee avoiding a null. Therefore, a procedure to map the gain loss to the optimum array configuration is a better way to quickly react to beam non-correspondence. Some embodiments therefore firstly reconfigure the antenna to the best configuration to optimize the uplink gain under the misalignment condition and only then attempt a full realignment procedure. From the user equipment 20 perspective, the advantages of such a method are: Avoid radio link failure by quickly reacting to the misalignment detection by reconfiguring the array; Avoid radio link failure by delaying lengthy and costly full realignment procedure (until after an optimized configuration is applied); Optimize gain towards gNB 10 under the misalignment conditions and avoid unnecessary increase in power consumption. From the network perspective, the advantage of such method is lower interference. Misalignment might increase cell interference, thus degrade capacity for neighbouring user equipment. With this implementation, the interference will be significantly decreased as we will redirect the gain towards the serving cell.

A person of skill in the art would readily recognize that blocks of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the blocks of said above-described methods. The program storage devices may be, e.g., digital memories, magnetic storage media such as a magnetic disks and magnetic tapes, hard drives, or optically readable digital data storage media. The embodiments are also intended to cover computers programmed to perform said blocks of the above-described methods. A person of skill in the art would also recognize that the illustration of a specific order of blocks does not necessarily imply that there is a required or preferred order for the blocks and that the order may be varied. A person of skill in the art would furthermore recognize that it may be possible to omit a block or blocks.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method, comprising:
    determining, from an indication that an initial uplink beam between a user equipment and a network node is misaligned with respect to a downlink beam between said network node and said user equipment, at least one misalignment angle between said initial uplink beam and said downlink beam, wherein the indication comprises at least a reduction in gain received by the network node, and wherein the at least one misalignment angle is determined by mapping the reduction in gain to prestored information comprising a plurality of misalignment angles; and
    reconfiguring said uplink beam based on said misalignment angle to produce a reconfigured uplink beam.

2. The method of claim 1, comprising at least one of: receiving at said user equipment said indication from said network node; and determining said indication within said user equipment.

3. The method of claim 2, wherein said indication is an indication of a power difference between an expected reception power level at said network node and an actual reception power level at said network node.

4. The method of claim 1, wherein said determining comprises determining said misalignment angle from prestored information which relates values of said indication to values of said misalignment angle.

5. The method of claim 1, wherein said reconfiguring comprises reconfiguring said uplink beam based on said misalignment angle to produce at least one of said reconfigured uplink beam which avoids a transmission null along said misalignment angle and said reconfigured uplink beam with an increased gain along said misalignment angle compared to said initial uplink beam.

6. The method of claim 1, wherein said reconfiguring comprises reconfiguring said uplink beam by retaining all those antenna array elements used to produce said initial uplink beam and applying changed antenna array configuration values of all those antenna array elements based on said misalignment angle to produce said reconfigured uplink beam.

7. The method of claim 1, wherein said reconfiguring comprises reconfiguring said uplink beam by applying changed antenna array configuration values based on said misalignment angle to produce said reconfigured uplink beam.

8. The method of claim 1, wherein said reconfiguring comprises reconfiguring said uplink beam by applying changed antenna array phase shifter values based on said misalignment angle to produce said reconfigured uplink beam.

9. The method of claim 1, wherein said reconfiguring comprises reconfiguring said uplink beam by applying changed antenna array values based on said misalignment angle to produce a plurality of sub-array uplink beams to create said reconfigured uplink beam.

10. The method of claim 1, wherein said reconfiguring comprises determining said changed antenna array values from prestored information which relates values of said misalignment angle to values of gain for said changed antenna array values.

11. The method of claim 10, wherein said prestored information relates values of said misalignment angle to values of gain for a plurality of changed antenna array values.

12. The method of claim 11, wherein said reconfiguring comprises selecting that one of said plurality of changed antenna array values which achieves a greatest gain improvement for said misalignment angle.

13. The method of claim 10, wherein said prestored information relates different ranges of values of said misalignment angle to a corresponding plurality of changed antenna array values for that range and said reconfiguring comprises determining which range of values of said misalignment angle that said misalignment angle falls within and selecting that one of said plurality of changed antenna array values corresponding to that range.

14. An apparatus, comprising:
    at least one processor; and
    at least one memory including computer program code for one or more programs,
    the at least one memory and the computer program code configured to, with the at least one processor, cause the apparatus to perform at least the following:
    determine from an indication that an initial uplink beam between a user equipment and a network node is misaligned with respect to a downlink beam between said network node and said user equipment, at least one misalignment angle between said initial uplink beam and said downlink beam, wherein the indication comprises at least a reduction in gain received by the network node, and wherein the at least one misalignment angle is determined by mapping the reduction in gain to prestored information comprising a plurality of misalignment angles; and
    reconfigure said uplink beam based on said misalignment angle to produce a reconfigured uplink beam.

15. The apparatus of claim 14, wherein the at least one memory and the computer program code are further configured to, with the at least one processor, cause the apparatus to:

reconfigure said uplink beam based on said misalignment angle to produce at least one of said reconfigured uplink beam which avoids a transmission null along said misalignment angle and said reconfigured uplink beam with an increased gain along said misalignment angle compared to said initial uplink beam.

16. The apparatus of claim 14, wherein the at least one memory and the computer program code are further configured to, with the at least one processor, cause the apparatus to:

reconfigure said uplink beam by retaining all those antenna array elements used to produce said initial uplink beam and applying changed antenna array configuration values of all those antenna array elements based on said misalignment angle to produce said reconfigured uplink beam.

17. The apparatus of claim 14, wherein the at least one memory and the computer program code are further configured to, with the at least one processor, cause the apparatus to:

reconfigure said uplink beam by applying changed antenna array configuration values based on said misalignment angle to produce said reconfigured uplink beam.

18. The apparatus of claim 14, wherein the at least one memory and the computer program code are further configured to, with the at least one processor, cause the apparatus to:

reconfigure said uplink beam by applying changed antenna array phase shifter values based on said misalignment angle to produce said reconfigured uplink beam.

19. The apparatus of claim 14, wherein the at least one memory and the computer program code are further configured to, with the at least one processor, cause the apparatus to:

reconfigure said uplink beam by applying changed antenna array values based on said misalignment angle to produce a plurality of sub-array uplink beams to create said reconfigured uplink beam.

20. A user equipment, comprising at least one processor and at least one memory including computer instructions that, when executed by the at least one processor, cause the user equipment to perform:

determine from an indication that an initial uplink beam between said user equipment and a network node is misaligned with respect to a downlink beam between said network node and said user equipment, at least one misalignment angle between said initial uplink beam and said downlink beam, wherein the indication comprises at least a reduction in gain received by the network node, and wherein the at least one misalignment angle is determined by mapping the reduction in gain to prestored information comprising a plurality of misalignment angles; and reconfigure said uplink beam based on said misalignment angle to produce a reconfigured uplink beam.

\* \* \* \* \*